United States Patent
Deluca et al.

(10) Patent No.: US 10,666,598 B2
(45) Date of Patent: May 26, 2020

(54) MODIFICATION OF SOCIAL MESSAGE BASED ON EVENT DATA

(71) Applicant: International Business Machines Corporation, Armonk, NY (US)

(72) Inventors: Lisa Seacat Deluca, Baltimore, MD (US); Jenny S. Li, Danbury, CT (US); Dana L. Price, Surf City, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/149,405

(22) Filed: May 9, 2016

(65) Prior Publication Data

US 2017/0324698 A1    Nov. 9, 2017

(51) Int. Cl.
*H04L 12/58*    (2006.01)
*H04L 12/18*    (2006.01)

(52) U.S. Cl.
CPC .......... *H04L 51/32* (2013.01); *H04L 12/1881* (2013.01); *H04L 51/26* (2013.01)

(58) Field of Classification Search
CPC ............................... H04L 51/32; H04L 51/24
USPC ....................................................... 709/206
See application file for complete search history.

(56) References Cited

U.S. PATENT DOCUMENTS

| 7,366,113 | B1* | 4/2008 | Chandra | H04L 41/12 370/255 |
| 2006/0053199 | A1* | 3/2006 | Pricken | G06Q 10/107 709/206 |
| 2009/0150489 | A1* | 6/2009 | Davis | G06Q 10/107 709/204 |
| 2010/0192162 | A1 | 7/2010 | Conner et al. | |
| 2012/0030194 | A1 | 2/2012 | Jain | |
| 2013/0073280 | A1 | 3/2013 | O'Neil et al. | |
| 2014/0187213 | A1* | 7/2014 | Shuster | H04W 4/023 455/414.1 |
| 2014/0343936 | A1 | 11/2014 | Thapar | |
| 2015/0052201 | A1 | 2/2015 | Brooks et al. | |
| 2015/0177914 | A1* | 6/2015 | Coyner | G06F 3/0481 715/753 |
| 2015/0237464 | A1* | 8/2015 | Shumaker | H04L 51/20 709/204 |

OTHER PUBLICATIONS

P. Mell et al., "The Nist Definition of Cloud Computing", National Institute of Standards and Technology, Information Technology Laboratory, Sep. 2011, pp. 1-7.

(Continued)

*Primary Examiner* — Brian Whipple
*Assistant Examiner* — John Fan
(74) *Attorney, Agent, or Firm* — Law Office of Jim Boice

(57) ABSTRACT

A method, system, and/or computer program product alter a state of a transmitted message. One or more processors detect an initial broadcast of a message. The message includes a time-sensitive posting, which is related to an event that occurs at an event time. Processor(s) then compare a current time to the event time. In response to determining that the current time is within a predefined time period in proximity to the event time, processor(s) issue an instruction to alter a state of the message.

11 Claims, 5 Drawing Sheets

(56) References Cited

OTHER PUBLICATIONS

Anonymous, "Add Events to Google Calendar From Gmail", Official Gmail Blog, Gmail. Googleblog.com, May 2, 2013, pp. 1-2.
Anonymous, "Natural Language Processing", Wikipedia.org, Wikimedia Foundation, Inc., Retrieved May 9, 2016, Last Edited Apr. 21, 2016, pp. 1-10.
Anonymous, "Method and Apparatus to Handle Outdated Posts in Social Environments", IP.com, No. 000236718, May 12, 2014, pp. 1-4.
Anonymous, "Method for Timed Evolution of a Message", IP.com, No. 000235585, Mar. 10, 2014, pp. 1-5.
U.S. Appl. No. 14/869,574, filed Sep. 29, 2015.
List of IBM Patents or Patent Application Treated as Related.
U.S. Appl. No. 14/631,081, filed Feb. 25, 2015.

* cited by examiner

MODIFICATION OF SOCIAL MESSAGE BASED ON EVENT DATA

BACKGROUND

The present disclosure relates to the field of computers, and specifically to computers that handle messaging traffic. Still more specifically, the present invention relates to computers that handle messaging traffic that is capable of being rebroadcast.

SUMMARY

A method, system, and/or computer program product alter a state of a transmitted message. One or more processors detect an initial broadcast of a message. The message includes a time-sensitive posting, which is related to an event that occurs at an event time. Processor(s) then compare a current time to the event time. In response to determining that the current time is within a predefined time period in proximity to the event time, processor(s) issue an instruction to alter a state of the message.

DETAILED DESCRIPTION

Figure 1:
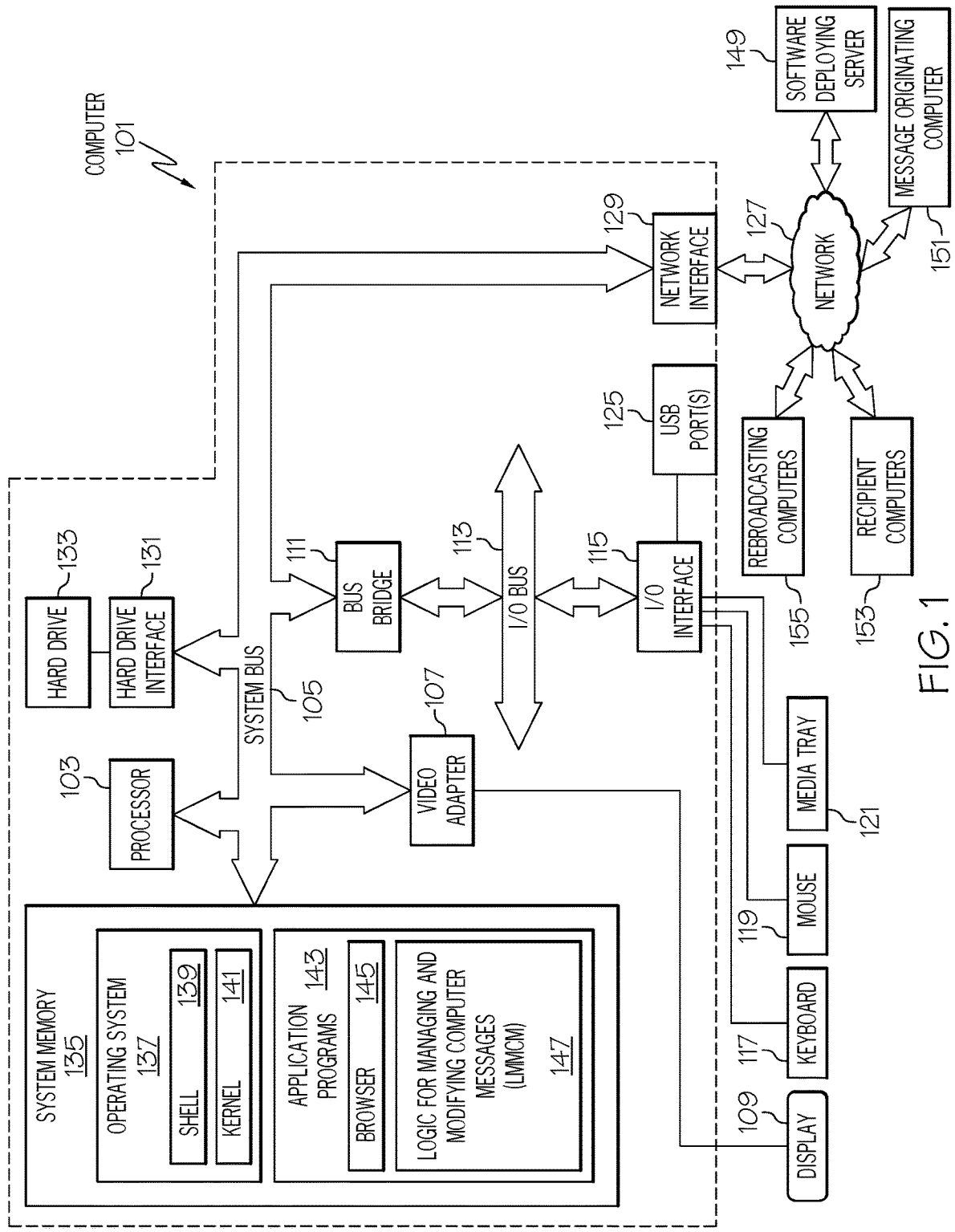
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or message originating computer 151 and/or recipient computers 153 and/or rebroadcasting computers 155 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing and Modifying Computer Messages (LMMCM) 147. LMMCM 147 includes code for implementing the processes described below, including those described in FIGS. 2-5. In one embodiment, computer 101 is able to download LMMCM 147 from software deploying server 149, including in an on-demand basis. In one embodiment, software deploying server 149 is able to execute one or more instructions from LMMCM 147 and provide the results to computer 101, thus relieving computer 101 from the need to utilize its internal processing power.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Often times a large number of social messages are related to a current, future, or past event. Examples of such messages include e-mail, short limited-character messages designed to be received on mobile devices, etc.

Figure 2:
FIG. 2 depicts an exemplary computer message that is capable of being rebroadcast.
Figure 3:
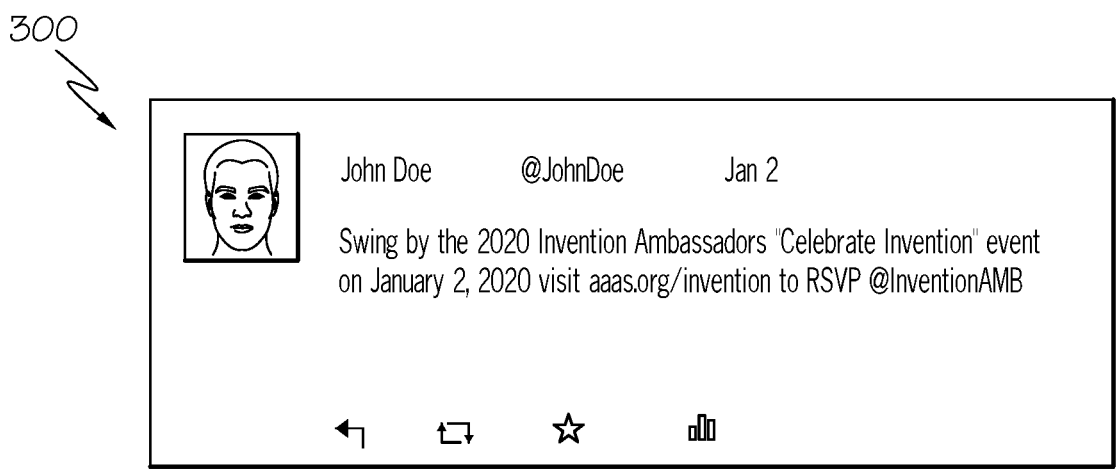
FIG. 3 illustrates the computer message shown in FIG. 2 after being textually modified for rebroadcast.

For example, consider the original message 200 in FIG. 2, which depicts an exemplary computer message that is capable of being rebroadcast. In this example, the message is related to an upcoming event, which will occur "tomorrow". When a message recipient sees original message 200, they may choose to rebroadcast it to another recipient. However, assume now that the rebroadcasting occurs two days after "tomorrow". When the new recipient receives the rebroadcast, he/she will likely assume that "tomorrow" means the day after he/she received the rebroadcast, which is erroneous. That is, by the time the recipient of the rebroadcast receives message 200, the event would have taken place two days earlier, despite what the rebroadcast message 200 says.

Even if the recipient of the rebroadcast receives message 200 before the event occurs, there is still confusion as to when the event will take place, particularly if the message itself is received "tomorrow".

Thus, the present invention provides several solutions to, but is not limited to, such scenarios and the like. More specifically, one or more embodiments of the present invention provide a way to visualize a social message that is related to an event in such a way as to contextually indicate to a viewer of the message when the event is taking or will/did take place. This allows a recipient to reuse/rebroadcast the message 200 by the system dynamically modifying its contents based on temporal context and other features described herein. These modifications thus reduce confusion among members of a social community when an "old" posting is reposted with outdated content. This allows message 200 to be reposted/rebroadcast many more times, which is desirable for a user's social reach.

For example, the present invention allows a user to write one message that can be used before, during and after an event and reposted/rebroadcasted by message recipients. Without the present invention, the author of message 200 might need to write multiple different social postings, each of which would be reposted. Thus, the invention saves the user time and effort by reducing the number of messages to manage and also increases her social reach.

In accordance with one or more embodiments of the present invention, a user creates a social message using any of multiple social media tools. As shown in FIG. 2, the created message 200 includes a reference to an event ("Celebration Invention") as well as the event date ("tomorrow").

However, in order to avoid confusion when the message 200 is initially broadcast, as well as when message 200 is rebroadcast, the date of the event is determined/inferred based on the message itself. That is, the system will examine the original broadcast date (e.g., Jan. 1, 2020) of message 200, and interpret "tomorrow" as being Jan. 2, 2020. Thus, the initial broadcast of or future rebroadcasts of message 200 will be modified to either read "Jan. 2, 2020" instead of "tomorrow", or else will use alternate temporal words (e.g., "today" if message 200 is rebroadcast on Jan. 2, 2020). Alternatively, the system will extract the term "2020 Invention Ambassadors "Celebrate Invention"", and will then browse the World Wide Web (e.g., a webpage for "Invention Ambassadors") looking for the actual date of the "2020 Invention Ambassadors "Celebrate Invention"". This actual date is then used in the initial broadcast of or future rebroadcasts of message 200.

Similarly, the date of the event may be tied to a new entry mechanism. For example, the person creating the social message 200 might specify when the event is using a new entry user interface active field.

Assume now that a second user views message 200 (i.e., it has been rebroadcast by an original recipient of message 200). The event date determined above is compared against the date in which the second user is viewing the message. However, message 200 has now been modified for rebroadcast to show that "tomorrow" is actually "Jan. 2, 2020", as shown in altered message 300 in FIG. 3. Alternatively, altered message 300 could reflect that the event is currently taking place, has already taken place, will take place in the near future (e.g., in the next five minutes), will take place in the distant future (e.g., a week from now), etc.

In one or more embodiments of the present invention, the original message 200 is modified not by changing the wording/text (e.g., changing "tomorrow" to "today" or "Jan. 2, 2020), but rather modifies the visual appearance of altered message 300. Examples of such visual modification include, but are not limited to, increasing/decreasing font sizes, changing font color or style, increasing/decreasing image sizes, highlighting/graying out content, inclusion or removal of icons, badges or other features.

Figure 4:
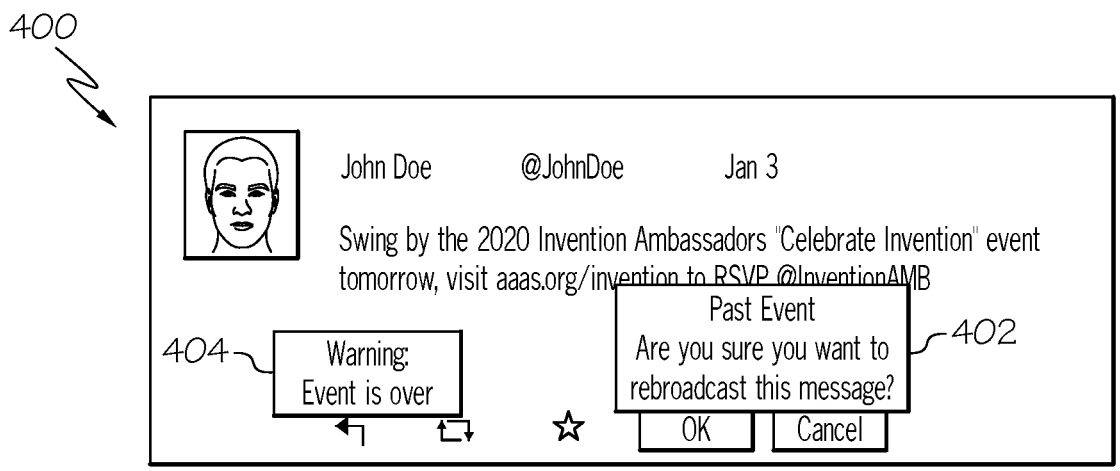
FIG. 4 depicts the computer message shown in FIG. 2 after being modified with a rebroadcast option icon for selectively rebroadcasting the message.

Furthermore, if the message 200/300 refers to an event that has passed, the system can include a warning before the user rebroadcasts the message 200/300. For example, as shown in FIG. 4, the computer message 200 shown in FIG. 2 has now been modified as message 400, which includes a rebroadcast option icon 402. Rebroadcast option icon 402 not only lets the potential rebroadcaster know that the subject/event of the original message 200 has already taken place, but gives the potential rebroadcaster the option to either rebroadcast the message 200 anyway ("Ok"), or to elect not to rebroadcast the message ("Cancel").

In an embodiment of the present invention, if the rebroadcaster elects to rebroadcast the message 200, then an alert icon 404 will be inserted into the message 200 before it is rebroadcast.

In various embodiments of the present invention, the "rebroadcaster" is either a receiving device (e.g., rebroadcasting computers 155 shown in FIG. 1) and/or a supervisory computer (e.g., computer 101 shown in FIG. 1). For example, assume that the messages 200/300 are messages being sent through a social media network. In this example, the "rebroadcaster" is the device that receives the messages 200/300 (e.g., recipient computers 153) and/or the social media controlling system (e.g., computer 101), which alone or in combination provide the rebroadcasting computers 155 depicted in FIG. 1.

While the depicted rebroadcast option icon 402 indicates that the event is over, a similar type of option icon can be presented if the event is imminent (e.g., within the hour), has been rescheduled to a later time and date, etc.

In one or more other embodiments, the shading, coloring, font size, etc. of the original message 200 and/or rebroadcast message 300 is adjusted, in order to give the recipient a visual cue that the event is imminent (will occur within the hour), has already occurred (e.g., yesterday), etc.

Figure 5:
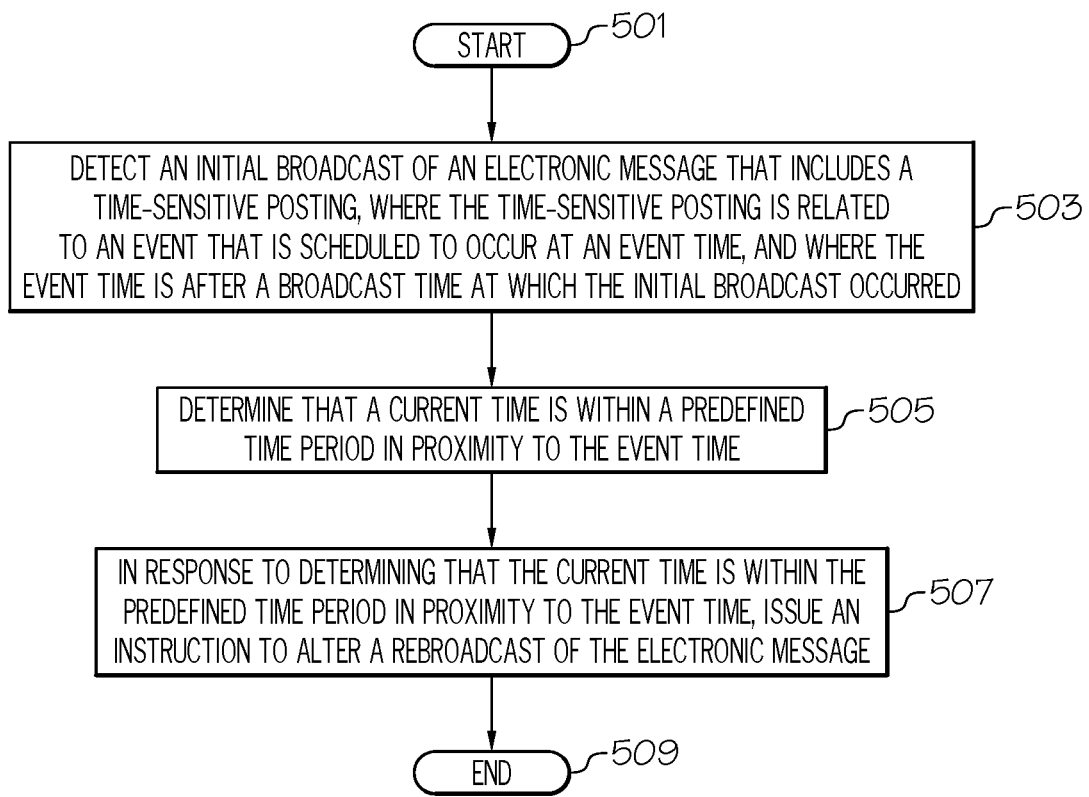
FIG. 5 is a high-level flow chart of one or more steps performed by one or more computing and/or other hardware devices to modify the rebroadcasting of a computer message.

With reference now to FIG. 5, a high-level flow chart of one or more steps performed by one or more computing and/or other hardware devices to modify the rebroadcasting of a computer message is presented.

After initiator block 501, one or more processors (e.g., processor 103 shown in FIG. 1 in computer 101) detect an initial broadcast of a message (e.g., the original version of message 200 shown in FIG. 2), which was broadcast from computer 101 or message originating computer 151 to one or more of the recipient computers 153 and/or one more of the rebroadcasting computers 155 (which are all or part of the recipient computers 153 that received the original message 200). As shown in message 200 and discussed above, the message includes a time-sensitive posting. That is, the time-sensitive posting is related to an event that is scheduled to occur at an event time, which is after (e.g., "tomorrow") a broadcast time (e.g., Jan. 1, 2020) at which the initial broadcast occurred. Note that the event time, broadcast time, and other times relevant to the message are any temporal notation, including but not limited to time of day, date, day of the week, etc. Similarly, if the message is a device-to-device message (e.g., a message in which a first computer lets a second computer know that a software upgrade will occur at a time that is specific to the minute, second, or even nanosecond), then the time of the event is described at an even finer level of granularity.

As described in block 505, the processor(s) determine that a current time is within a predefined time period in proximity to the event time. This current time may be before or after the event time for the event. The processor(s) determine the current time using any type of on-board clock that provides the current time, date, etc., and determine the event time by interpretation of the context of the words in the message 200, referring to a table, etc., in order to identify exactly the time and date for which the event is scheduled.

As described in block 507, the processor(s), in response to determining that the current time is within the predefined time period in proximity to the event time, issue an instruction to alter a rebroadcast of the message.

For example, assume that the processor(s) determine that the current time is after the event time (i.e., when a recipient is viewing message 200 the event has already transpired). In this embodiment, the processor(s), in response to determining that the current time is after the event time, alter the rebroadcast of the message by issuing an instruction (e.g., to one or more of the rebroadcasting computers 155 that received the original message 200) to block the rebroadcast of the message. Thus, the message 200 will not be forwarded after the event occurs.

In another example/embodiment of the present invention, assume again that the processor(s) have determined that the current time is after the event time. In this embodiment, however, the processor(s), in response to determining that the current time is after the event time, issue an instruction (e.g., to one or more of the rebroadcasting computers 155) to alter the message 200 by inserting an alert (e.g., alert icon 404 shown in FIG. 4) in the message before being rebroadcasted, thus warning recipients of the rebroadcasted message that the event is over.

In another example/embodiment of the present invention, assume again that the processor(s) have determined that the current time is after the event time. In this embodiment, the processor(s), in response to determining that the current time is after the event time, issue an instruction (e.g., to the message originating computer 151) to alter the message by including a rebroadcast option (e.g., rebroadcast option icon 402 shown in FIG. 4), which warns a potential rebroadcaster (e.g., using one or more of the rebroadcasting computers 155) of the message that the current time is after the event time. As shown in FIG. 4, the rebroadcast option icon 402 gives the potential rebroadcaster the option of either rebroadcasting or not rebroadcasting the message.

In another embodiment of the present invention, assume now that the event described in the original message 200 has not yet transpired. However, the current (real) time is within some predetermined amount of time (e.g., one hour) before the event time, as determined by the processor(s). In response to determining that the current time is within the predetermined amount of time before the event time, the processor(s) modify (or issue an instruction to the rebroadcasting computers 155 to modify) a text in the message that describes the event time, such that this modifying changes a wording of the message (see altered message 300 in FIG. 3). The processor(s) then issue directions to the rebroadcasting computer 155 to include the modified text that describes the event time in the message before rebroadcasting the message.

In another embodiment of the present invention, assume again that the event described in the original message 200 has not yet transpired, and that the current time is within a predetermined amount of time before the event time. In this embodiment, in response to determining that the current time is within the predetermined amount of time before the event time, the processor(s) modify a visual appearance of original text in the message (e.g., using coloring, shading, new fonts, etc.). This modifying changes the appearance of the word in the message, but leaves the wording (i.e., the actual text) of the original text unchanged. The processor(s) then issue an instruction to a potential rebroadcaster (e.g., one of the rebroadcasting computers 155 shown in FIG. 1) to include the modified visual appearance of the original text in the message before being rebroadcasted.

The flow-chart shown in FIG. 5 ends at terminator block 509.

In an embodiment of the present invention, the processor(s) determine a scheduled time for the event based on a record of periodically scheduled events for a group of recipients of the initial broadcast of the message. For example, assume that the recipients of message 200 are members of a club that meets every Thursday. The processor(s) are able to determine this fact by browsing the webpage for the club. Thus, if the message says "the next meeting", the processor(s) will ascertain that the "next meeting" will be on the Thursday following the date that the original message 200 was broadcast.

While the invention has been described thus far relative to events that are to occur, the present invention also applies to messages that are not attached to an event. For example, the message may describe a computer condition. That is, message 200 could have said "All computers in the network will be unable to receive e-mail today". Thus, "unable to receive e-mail" is not an event, but rather is a condition. However, determining when this condition did or will actually occur when the original message 200 is rebroadcast is achieved in the same manner described above, with the same options (alerts, option buttons, etc.) described above.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
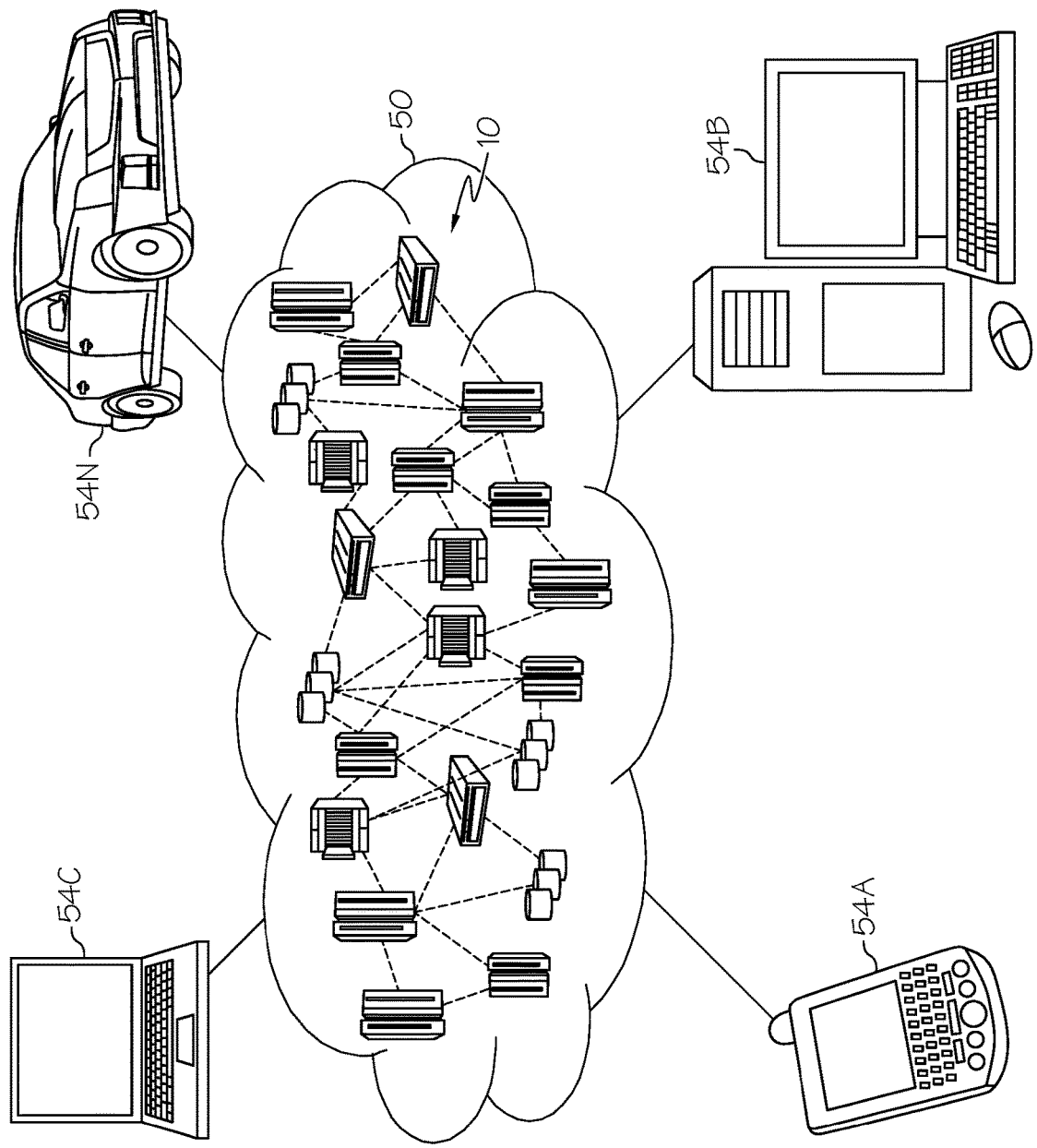
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
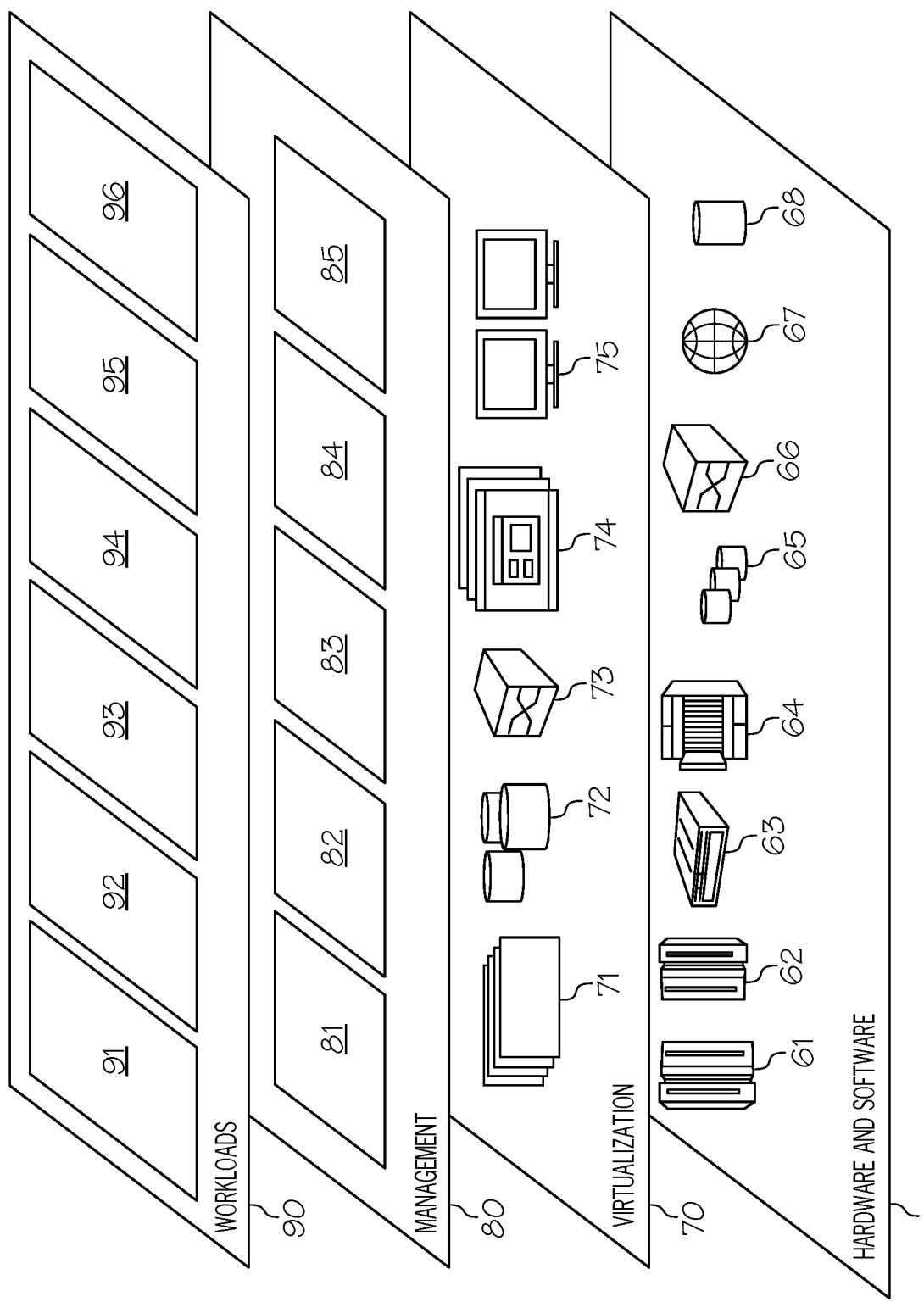
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer message processing 96, for performing the processes described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   detecting, by one or more processors, an initial broadcast of an original electronic message to a rebroadcasting computer, wherein the original electronic message comprises text that describes an event that occurs at an event time;
   comparing, by one or more processors, a current time to the event time;
   modifying, by one or more processors, the original electronic message to create a modified electronic message, wherein the modified electronic message is created at the current time, wherein the current time is before the event time but after an initial time at which the initial broadcast of the original electronic message occurred, and wherein the modified electronic message includes a new description of the event time;
   determining that the event time has passed;
   in response to determining that the event time has passed, blocking a rebroadcast of the modified electronic message and modifying the modified electronic message to create a further modified electronic message, wherein the further modified electronic message describes a subsequent time and date for which the event is rescheduled after the event time; and
   broadcasting the further modified electronic message.

2. The method of claim 1, further comprising:
   in response to determining that the event time has passed, altering a visual appearance of the modified electronic message in order to indicate that the event time has passed.

3. The method of claim 1, wherein the new description of the event time is a new text description that differs from a text description of the event time found in the original electronic message.

4. The method of claim 1, further comprising:
   determining, by one or more processors, a scheduled time for the event based on a record of periodically scheduled events for a group of recipients of the initial broadcast of the original electronic message.

5. A computer program product comprising one or more computer readable storage mediums, wherein said one or more computer readable storage mediums are not transitory signals per se, and program instructions stored on at least one of the one or more computer readable storage mediums, the stored program instructions comprising:
   program instructions to detect an initial broadcast of an original electronic message to a rebroadcasting computer, wherein the original electronic message includes a time-sensitive posting, wherein the time-sensitive posting comprises text that describes an event that occurs at an event time;
   program instructions to compare a current time to the event time;
   program instructions to modify the original electronic message to create a modified electronic message, wherein the modified electronic message is created at the current time, wherein the current time is before the event time but after an initial time at which the initial broadcast of the original electronic message occurred, and wherein the modified electronic message includes a new description of the event time;
   program instructions to determine that the event time has passed;
   program instructions to, in response to determining that the event time has passed, block a rebroadcast of the modified electronic message and to modify the modified electronic message to create a further modified electronic message, wherein the further modified electronic message describes a subsequent time and date for which the event is rescheduled after the event time; and program instructions to broadcast the further modified electronic message.

6. The computer program product of claim 5, further comprising:
   program instructions to, in response to determining that the event time has passed, alter a visual appearance of the modified electronic message in order to indicate that the event time has passed.

7. The computer program product of claim 5, wherein the new description of the event time is a new text description that differs from a text description of the event time found in the original electronic message.

8. A computer system comprising one or more processors, one or more computer readable memories, one or more computer readable storage mediums, wherein said one or more computer readable storage mediums are not transitory signals per se, and program instructions stored on at least one of the one or more computer readable storage mediums for execution by at least one of the one or more processors via at least one of the one or more computer readable memories, the stored program instructions comprising:
   program instructions to detect an initial broadcast of an original electronic message to a rebroadcasting computer, wherein the original electronic message includes a time-sensitive posting, wherein the time-sensitive posting comprises text that describes an event that occurs at an event time;
   program instructions to compare a current time to the event time;
   program instructions to modify the original electronic message to create a modified electronic message, wherein the modified electronic message is created at the current time, wherein the current time is before the event time but after an initial time at which the initial broadcast of the original electronic message occurred, and wherein the modified electronic message includes a new description of the event time;
   program instructions to determine that the event time has passed;
   program instructions to, in response to determining that the event time has passed, block a rebroadcast of the modified electronic message and to modify the modified electronic message to create a further modified electronic message, wherein the further modified electronic message describes a subsequent time and date for which the event is rescheduled after the event time; and
   program instructions to broadcast the further modified electronic message.

9. The computer system of claim 8, further comprising:
   program instructions to, in response to determining that the event time has passed, alter a visual appearance of the modified electronic message in order to indicate that the event time has passed.

10. The computer system of claim 8, wherein the new description of the event time is a new text description that differs from a text description of the event time found in the original electronic message.

11. The method of claim 1, wherein the event is a social event.

* * * * *